(12) United States Patent
Noiret

(10) Patent No.: US 7,823,670 B2
(45) Date of Patent: Nov. 2, 2010

(54) HYBRID DRIVE TRAIN AND HYBRID VEHICLE EQUIPPED WITH SAME

(75) Inventor: Christian Noiret, Le Pecq (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 290 days.

(21) Appl. No.: 12/067,169

(22) PCT Filed: Sep. 11, 2006

(86) PCT No.: PCT/FR2006/050866

§ 371 (c)(1),
(2), (4) Date: Mar. 17, 2008

(87) PCT Pub. No.: WO2007/031676

PCT Pub. Date: Mar. 22, 2007

(65) Prior Publication Data

US 2008/0223635 A1    Sep. 18, 2008

(30) Foreign Application Priority Data

Sep. 15, 2005    (FR) .................................. 05 52776

(51) Int. Cl.
*B60L 11/00*    (2006.01)
(52) U.S. Cl. .................. 180/65.29; 180/65.28; 903/905
(58) Field of Classification Search .............. 180/65.29, 180/65.285; 903/952, 905, 906; 123/179.25
See application file for complete search history.

(56) References Cited

U.S. PATENT DOCUMENTS

| | | | |
|---|---|---|---|
| 6,176,808 B1 * | 1/2001 | Brown et al. ................... | 477/5 |
| 6,345,216 B1 * | 2/2002 | Morimoto et al. .............. | 701/22 |
| 6,364,042 B1 * | 4/2002 | Joachim ................... | 180/65.25 |
| 6,394,208 B1 * | 5/2002 | Hampo et al. ............ | 180/65.25 |
| 6,453,863 B1 * | 9/2002 | Pels et al. ................. | 123/179.3 |
| 6,453,864 B1 * | 9/2002 | Downs et al. ............ | 123/179.3 |
| 7,024,859 B2 * | 4/2006 | Jayabalan et al. ............. | 60/716 |

(Continued)

FOREIGN PATENT DOCUMENTS

DE    10040354 A1    2/2002

(Continued)

OTHER PUBLICATIONS

International Search Report mailed Feb. 1, 2007 in PCT/FR2006/050866.

*Primary Examiner*—Jeffrey J Restifo
(74) *Attorney, Agent, or Firm*—Nicolas E. Seckel

(57) ABSTRACT

The invention concerns a hybrid drive train comprising a heat engine (2), at least one first electrical machine (31) and at least a second electrical machine (32) each including a stator and a rotor, a battery (BAT) connected to the first and second electrical machines (31, 32), and a controlling member (5) for controlling the charge or discharge of the battery (BAT), the heat engine (2) and the first and second electrical machines (31, 32). The invention is characterized in that the first electrical machine (31) is arranged between the transmission member (4) and one (7D) of the driven wheels (7G, 7D), and in that the second electrical machine (32) is arranged inside the heat engine (2), the rotor of the second electrical machine (32) being fixed on a crank web and its stator (34) being fixed in the housing (36) of the heat engine (2).

15 Claims, 7 Drawing Sheets

U.S. PATENT DOCUMENTS

| | | |
|---|---|---|
| 7,117,963 B2 * | 10/2006 | Saito et al. .................. 180/65.1 |
| 7,463,968 B2 * | 12/2008 | Snyder ....................... 701/112 |
| 7,495,411 B2 * | 2/2009 | Kaneko et al. .............. 318/801 |
| 2003/0051679 A1 | 3/2003 | Iwata |
| 2003/0094322 A1 | 5/2003 | Bowen |
| 2003/0196842 A1 | 10/2003 | Hashimoto |
| 2006/0162972 A1 | 7/2006 | Hoshiba et al. |
| 2008/0223635 A1 * | 9/2008 | Noiret ....................... 180/65.2 |
| 2010/0138085 A1 * | 6/2010 | Sasaki et al. .................. 701/22 |

FOREIGN PATENT DOCUMENTS

| | | |
|---|---|---|
| DE | 10201601 C1 | 6/2003 |
| EP | 1354744 A | 10/2003 |
| JP | 05050865 A | 3/1993 |
| WO | WO 2005/007440 A | 1/2005 |

* cited by examiner

HYBRID DRIVE TRAIN AND HYBRID VEHICLE EQUIPPED WITH SAME

The invention relates to the field of vehicles, in particular a hybrid traction drive for use in motor vehicles.

The invention also relates to a method for managing a hybrid traction drive and a hybrid vehicle equipped with such a hybrid traction drive.

BACKGROUND OF THE INVENTION

The layout constraints for drive trains in vehicles are increasingly restrictive due to the growing number of accessories (power steering, air conditioning, . . . ), impact standards (frontal, pedestrian, . . . ), pollution control standards (catalytic converters, particulate filters, . . . ), and alternator-starters for stop-start systems.

The hybrid automotive drive combining heat propulsion and electric propulsion offers real advantages in reducing fuel consumption, but also in reducing pollutant gas emissions ($CO_2$ emissions).

In designing a hybrid traction drive, in addition to the usual members associated with the heat engine, at least two dedicated electrical machines must be introduced into the engine compartment in order to have enough electrical power available to meet the energy needs of the hybrid traction drive in all of the vehicle operating situations (driving conditions) where the electrical machines have to supplement the heat engine and/or recover energy.

By way of example, the following needs can be listed:
the need for a "high-power" starting member for the heat engine (for a very short, vibration-free start);
the need to be able to recharge the battery BAT while operating in electric drive mode at very low speeds or while stopped;
the need to recover energy during vehicle braking, also called "regenerative" braking;
the need to improve vehicle performance using the vehicle traction assist function, also called the "boost" drive, which provides a dynamic performance capability for the vehicle;
the need for a transmission that dynamically optimizes the best engine operating point;
. . . .

Some auto makers meet these needs partially by offering hybrid traction drives based on transmission members with an infinitely variable transmission, also designated with the Anglo-Saxon abbreviation "IVT" (Infinitely Variable Transmission), i.e., a transmission member that can enable all the transmission ratios in a set, minimum time interval compatible with the acceleration requested by the driver.

These transmission members are chiefly composed of at least one planetary gear train and at least two electrical machines.

There are several types of hybrid traction drive architecture: a so-called "series" hybrid traction drive, a so-called "parallel" hybrid traction drive and a so-called "series/parallel" (or power splitting) traction drive.

This latter architecture with split power employs a planetary gear train coupled to the differential, and thus to the vehicle wheels, by means of a reduction gear. This architecture makes it possible to have an infinitely variable transmission (IVT) that needs no clutch.

This type of architecture is described in particular in document WO 2005/007440.

The disadvantage of this solution is that the efficiency is not always optimal because of the electrical power split needed to operate it. That is, the electrical power needed, which can be as much as 30% of the engine power, is split (or recirculates) through the two electrical machines and a power electronics unit. This creates a loss of efficiency, the overall efficiency being a product of the three electrical efficiencies.

Moreover, such an architecture requires complete industrial retooling.

Another drawback is that although they meet hybrid needs, the number of electrical machines that have to be installed in the vehicle to power the IVT (in addition to those reserved for the hybrid drive and regenerative braking) quickly becomes prohibitive.

Another solution consists in sandwiching an electrical machine between the heat engine and the gearbox, with clutch-assisted torque transition.

The disadvantage of this other solution is that firstly, it increases the length of the drive train, and secondly, having the electrical machine positioned at the gearbox input reduces the hybrid operating potential. Furthermore, this solution cannot provide high power when starting the vehicle, nor can it recharge the battery when the vehicle is stopped without penalizing starting time or efficient recharging at very low speeds. In order to have such power available, it would be required to add a stop-start-type starting system, which, firstly, is limited in power, and secondly, creates an additional encumbrance due to the width of the alternator-starter belt. As far as starting time, acoustics and vibrations, the desired performance is therefore constrained.

In addition, the electrical regenerative braking function is tricky to control, since there must not be a gear ratio shift at the same time, or there will be a torque discontinuity during deceleration. That is, in order to recover maximum energy during braking, it is required to minimize pressure drops in the heat engine and thus change the gear ratio to make the engine speed drop as much as possible.

OBJECT OF THE INVENTION

An object of the invention is a hybrid traction drive that makes it possible to better meet the needs listed above, while remedying in particular the disadvantages previously cited. Other objects of the invention are a method for managing a hybrid traction drive according to vehicle driving conditions and a vehicle equipped with such a hybrid traction drive.

The main advantage provided by the invention is that it meets with all the specifications of a hybrid traction drive and also proposes a compact architecture in which the arrangement of the various members is optimized so that it takes up a space equivalent to that of a standard traction drive, additionally optimizing the space available under the hood of the vehicle.

Another advantage of the present invention is that it does not require any specific industrial development. Lastly, with the management method according to the invention, the hybrid traction drive adjusts appropriately to all vehicle driving conditions without impairing the heat and/or electrical efficiencies involved.

SUMMARY OF THE INVENTION

The invention proposes a vehicle hybrid traction drive having:
a heat engine equipped with a crankshaft whose crank arms extend substantially perpendicular to its longitudinal axis;

a transmission member positioned between the crankshaft output and the driven wheels of the vehicle, the crankshaft being coupled to the wheels via the transmission member;

at least one first electrical machine and at least one second electrical machine, each one having a stator and a rotor, the first electrical machine being capable of cooperating with the transmission member and the second electrical machine being capable of cooperating with the heat engine in order to provide combustion and/or electrical drive separately or jointly to the driven wheels;

a battery connected to the first and second electrical machines; and a control member capable of controlling the battery charge/discharge process, the heat engine and the first and second electrical machines.

Said drive is characterized in that the first electrical machine is positioned between the transmission member and one of the driven wheels, and in that the second electrical machine is positioned inside the heat engine, with the rotor of the second electrical machine attached onto a crank arm of the crankshaft and its stator secured inside the heat engine crankcase.

According to one characteristic, at least one second electrical machine is a starter or an alternator or an alternator-starter.

Another object of the invention is a method for managing a hybrid traction drive as described above, characterized in that it consists in controlling the heat engine, the first electrical machine, the at least one second electrical machine and the battery to adjust their operation according to the vehicle driving conditions.

According to a characteristic of the method, when the vehicle is at a stop, if the battery charge level is lower than a set charge level or if the heat engine speed is lower than a set speed, it consists in commanding the heat engine to recharge the battery via the at least one second electrical machine.

According to another characteristic, with the vehicle at a steady speed, if the speed is lower than a set speed, the method consists in commanding the first electrical machine to set the vehicle in motion via the transmission member until a set minimum battery charge level is reached, and then, once the minimum charge level is reached, it consists in controlling the heat engine, which is used to simultaneously move the vehicle forward and recharge the battery; and it consists in deactivating the first electrical machine if the speed increases beyond a set speed, to retain only the combustion drive powered solely by the heat engine.

According to another characteristic, when the vehicle is accelerating at a rate less than a set threshold for a set battery charge level and at a set power level requested at the wheel, the method consists in:

during a first pure electric drive phase, commanding the battery to power only the first electrical machine, with the first machine powering the movement of the vehicle by itself, during a second phase, still a pure electric drive phase in which the first electrical machine is still powering the vehicle's movement, additionally commanding the battery to power the at least one second electrical machine in order to start the heat engine; and during a third, pure combustion drive phase, commanding the heat engine to take over from the first electrical machine; the heat engine then powering the vehicle drive by itself via the transmission member.

According to the preceding characteristic, during the third, pure combustion drive phase, the method additionally consists in commanding the heat engine to recharge the battery.

According to another characteristic, when the vehicle is accelerating at a rate higher than a set threshold, the method consists in jointly commanding the heat engine, the first and the at least one second electrical machines and the battery to devote all available power to the acceleration of the vehicle.

According to another characteristic, when the vehicle acceleration rate is "in between", e.g., between an acceleration rate lower than a first set threshold and an acceleration rate higher than a second set threshold, the method consists in commanding only one or the other of the first and the at least one second electrical machines.

According to another characteristic, when the vehicle is decelerating at a rate lower than a set threshold, the method consists in commanding only the first electrical machine so as to enable regenerative braking.

According to another characteristic, when the vehicle is decelerating at a rate higher than a set threshold and the transmission member has a continuously variable transmission, the method consists in commanding the first electrical machine connected to the wheels and the at least one second electrical machine integrated into the crankshaft so that it contributes to braking the wheels, along with the first electrical machine, via the transmission member.

According to another characteristic of the method, which can be combined with any of the characteristics described above, when the transmission member has an electronically controlled manual gearbox, the method consists in commanding the first electrical machine, connected to the wheels, to take over from the heat engine during gear ratio change phases in order to reduce the discontinuity in torque to the wheel.

Lastly, according to another characteristic, when the vehicle is decelerating at a rate higher than a set threshold and the transmission member has a continuously variable transmission, the method consists in commanding the first electrical machine, connected to the wheels, and the at least one second electrical machine, integrated into the crankshaft, so that it contributes to braking the wheels, along with the first electrical machine, via the transmission member.

Another object of the invention is a vehicle equipped with a hybrid traction drive according to the description given above and employing the method described above.

Thus, the second electrical machine positioned on the crankshaft advantageously serves to enable starting operations that draw a lot of power, in the range of several KW, and battery recharging with the vehicle at a stop or in motion.

Likewise, the cooperation between the first and second electrical machines, one connected to the wheels and one integrated into the heat engine, respectively, serves to enable the combustion drive "boost" function for dynamic vehicle performance, as well as regenerative braking. In this case, a CVT-type transmission is necessary to be able to use the electrical machine integrated into the heat engine.

Using such a transmission also allows continuous optimization of heat engine efficiency.

Lastly, the electrical machines are advantageously placed in areas that are usually empty, and their introduction requires only slight modifications to the engine compartment.

BRIEF DESCRIPTION OF THE DRAWINGS

Other characteristics and advantages of the present invention will become clearer in the following description of non-limiting modes of embodiment thereof, referring to the attached drawings, in which:

FIGS. 5 to 13 respectively and schematically illustrate the various stages of the method for controlling a hybrid traction drive according to the invention in accordance with the driving status of the vehicle, in which:

FIG. 5 illustrates a first stage in which the vehicle is at a stop;

FIGS. 6 and 7 respectively illustrate first and second operating phases according to the invention, with the vehicle at a steady speed;

FIGS. 8 to 10 respectively illustrate first, second and third operating phases, with the vehicle accelerating at a low rate;

FIG. 11 illustrates an operating phase with the vehicle accelerating at a high rate;

FIGS. 12 and 13 respectively illustrate first and second operating phases with the vehicle decelerating quickly.

Elements appearing in more than one figure are labeled with the same reference numbers.

DETAILED DESCRIPTION OF THE INVENTION

FIGS. 1, 2, and 5 to 13 described below all show a top view of the front of a motor vehicle 1 if it is a front-wheel-drive vehicle, or the rear of the vehicle if it is a rear-wheel-drive vehicle.

In the rest of the description, these various figures will be considered as representing the front of the vehicle.

Electrical power is symbolized by a first type of arrow shown as an outline; mechanical power is symbolized by a second type of arrow filled in black.

Figure 1:
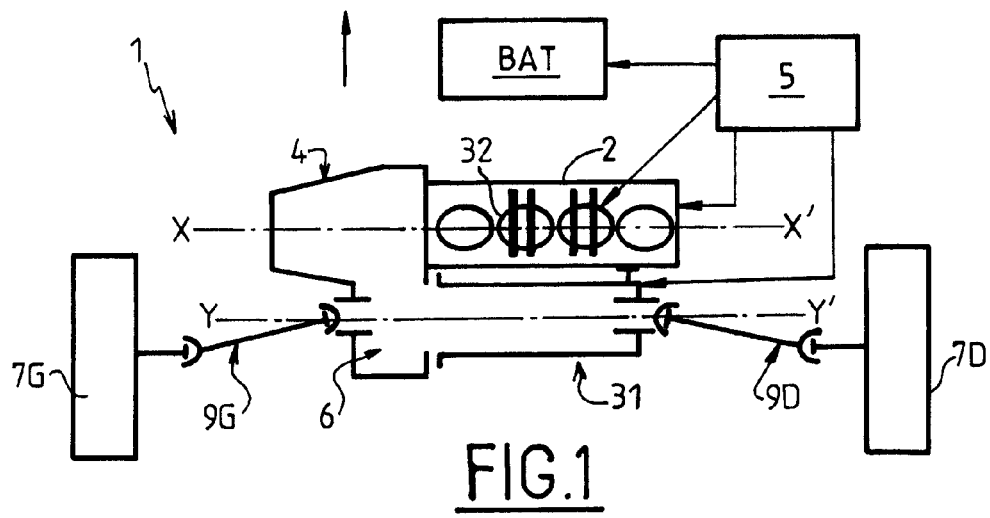
FIG. 1 illustrates a top view of a hybrid traction drive having a first electrical machine and a plurality of second electrical machines according to the invention, installed in the engine compartment of a motor vehicle.

FIG. 1 schematically illustrates a layout of a hybrid traction drive according to the invention showing the main members that contribute to the hybrid drive of a vehicle 1, namely:
- a heat engine 2;
- a first electrical machine 31 connected to the wheels 7G and 7D of the vehicle 1 via their respective suspension parts 9G and 9D;
- at least one second electrical machine 32—here four electrical machines—integrated into the heat engine 2, at least one of which is capable of acting as an alternator-starter;
- a transmission member 4 that couples the heat engine 2 and/or the first and second electrical machines 31 and/or 32 with the driven wheels 7G, 7D of the vehicle 1;
- a battery BAT; and
- a control member 5 for the hybrid traction drive capable of controlling the various members introduced above.

In accordance with this layout, the first electrical machine 31 is positioned behind the heat engine 2 and secured to it.

The direction the vehicle 1 moves in forward drive is shown by an arrow.

The rotation axis YY' of the first electrical machine 31 is parallel to the longitudinal axis XX' of the heat engine 2. The axes XX' and YY' lie respectively in planes parallel to one another. They can also lie in planes that form an angle with one another.

The transmission member 4 is laid out in a direction perpendicular to the two axes XX' and YY'. It is positioned and secured at the end of the heat engine 2 and the first electrical machine 31, with the heat engine 2 and/or the electrical machine 31 respectively coupled to the driven wheels 7G, 7D via the transmission member 4.

The transmission member 4 has an electronically controlled gearbox (ECGB), for example, or an automatic gearbox or, preferably, a continuously variable transmission (CVT), not shown. As is standard, it additionally has a reduction gear—not shown—coupled to the differential 6.

Figure 2:
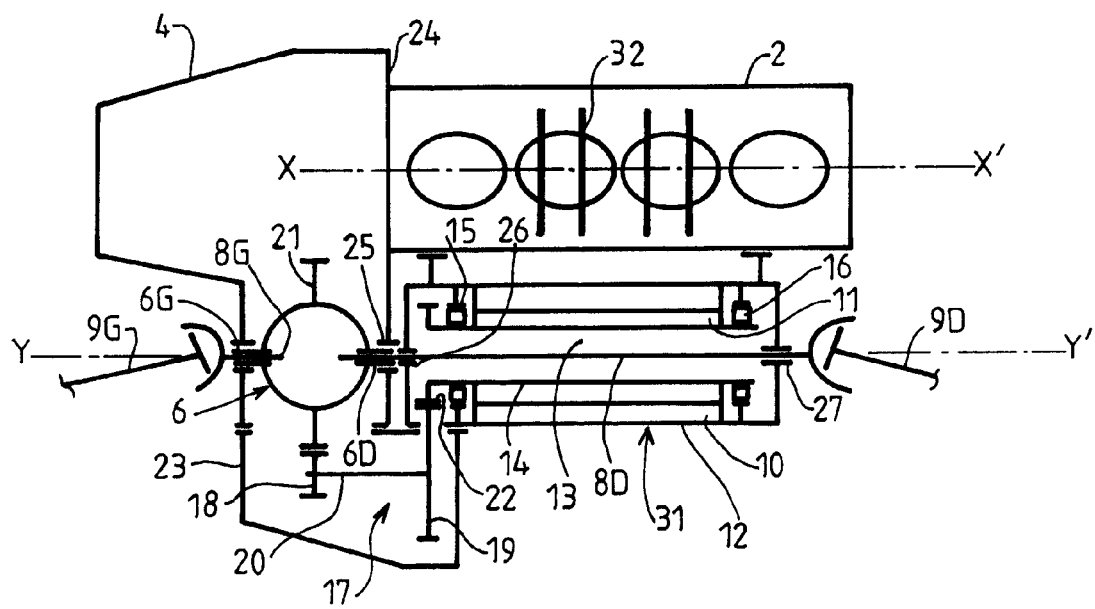
FIG. 2 schematically illustrates an embodiment of the first machine of a hybrid traction drive according to the invention.

Referring to FIG. 2, which illustrates an example of an embodiment of a first electrical machine 31 coupled to the transmission member 4 via a pinion reduction gear 17, the differential 6 has first and second outputs 6G and 6D coupled respectively to the driven wheels 7G and 7D of the vehicle 1 via two transmission shafts 8G and 8D, respectively, and the suspension means 9G and 9D.

The gearing assembly and other mechanical components with which a gearbox is traditionally equipped are purposely not shown so as to not clutter up the figure needlessly.

The first electrical machine 31 has a stator 10 and a rotor 11 that are concentric and hollow, both of which are housed inside a body 12 whose general shape is cylindrical. The body 12 has a central cavity 13 extending along the longitudinal axis YY' of the first electrical machine. The stator 10 is attached to the body 12 and the rotor 11 is set inside the stator 10 and surrounds the cavity 13.

The rotor 11 is integral with a hollow shaft 14 whose two free ends extend beyond the stator 11 and are rotatably supported by and connected to first and second bearings 15 and 16, respectively, attached to the body 12 of the first electrical machine 31. The hollow shaft 14 thus defines the cavity 13 around which the first electrical machine 31 is arranged.

The transmission shaft 8D is rotationally mounted, centered inside the cavity 13, and extends out both ends of the body 12.

A first end of the transmission shaft 8D is coupled to one 7D of the driven wheels 7G and 7D via the suspension part 9D, and the second end is coupled to the first output 6D of the differential 6.

The stators 10, rotor 11, cavity 13 and wheel shaft 8D are concentric and on the same axis as the longitudinal axis YY' of the first electrical machine 31.

In the example described, the coupling between the first electrical machine 31 and the differential 16 is achieved by means of a pinion reducer 17.

The reducer 17 is made up of a gear train having a first and a second pinion 18 and 19 of different diameters, rotationally linked and respectively placed at first and second ends of a secondary shaft 20. The shaft 20 extends between the ring gear 21 of the differential 6 and a gear wheel 22 attached to the hollow shaft 14 of the rotor 11 on the end nearest the differential 6; the first and second pinions 18 and 19 mesh with the ring gear 21 of the differential 6 and the gear wheel 22, respectively.

To aid with assembly tolerance and ease of assembly, it may be advantageous to embody the secondary shaft 20 as two segments rotationally linked to one another.

The purpose of this gear train is to mechanically couple the ring gear 21 of the differential 6 to the rotor 11 of the first electrical machine 31 with a gear ratio set by the ratio of the diameters and the number of teeth on the pinions 18 and 19.

In this embodiment, the pinion reducer 17 is placed inside a housing 23 that is arranged and attached underneath the transmission member 4 and partially under the body 12 of the first electrical machine 31. The larger diameter pinion 19 extends partially out of the housing 23 in order to mesh with the gear wheel 22 of the rotor 11 inside the body 12 of the first electrical machine 31.

The ring gear 21 of the differential 6 extends out of the housing 24 of the transmission member 4 in order to mesh with the smaller diameter pinion 18 inside the housing 23 of the reducer 17.

The output 6D of the differential 6 is rotatably supported by and connected to the housing 24 of the transmission member 4 via a bearing 25 integral with the housing 24.

The transmission shaft 8D is rotatably supported by and connected to the body 12 of the first electrical machine 31 via a first bearing 26 integral with the first end of the body 12 and via a second bearing 27 integral with the second end of the body 12.

In this embodiment, the output 6D of the differential 6 does not go into the first electrical machine 31, as the first electrical machine 31 couples with the differential 6 via the pinion reducer 17.

An embodiment of the second electrical machine 32 and its coupling with the heat engine 2 will now be described, with reference to FIGS. 3 and 4.

The reference 100 indicates the crankshaft of the heat engine 2, which is partially shown in the figures.

The crankshaft 100 has a longitudinal axis coincident with the axis XX' of the heat engine 2, around which are arranged in a standard manner central portions 28 or crank journals, riding on bearings 30 that support the crankshaft 100 and crank pins 40 with a rod 50 pivotally connected to each one.

In a known manner, each rod 50 is driven by a piston 60 that moves inside a sleeve 70. For greater clarity, the sleeve 70 is not shown in FIG. 4.

Figure 3:
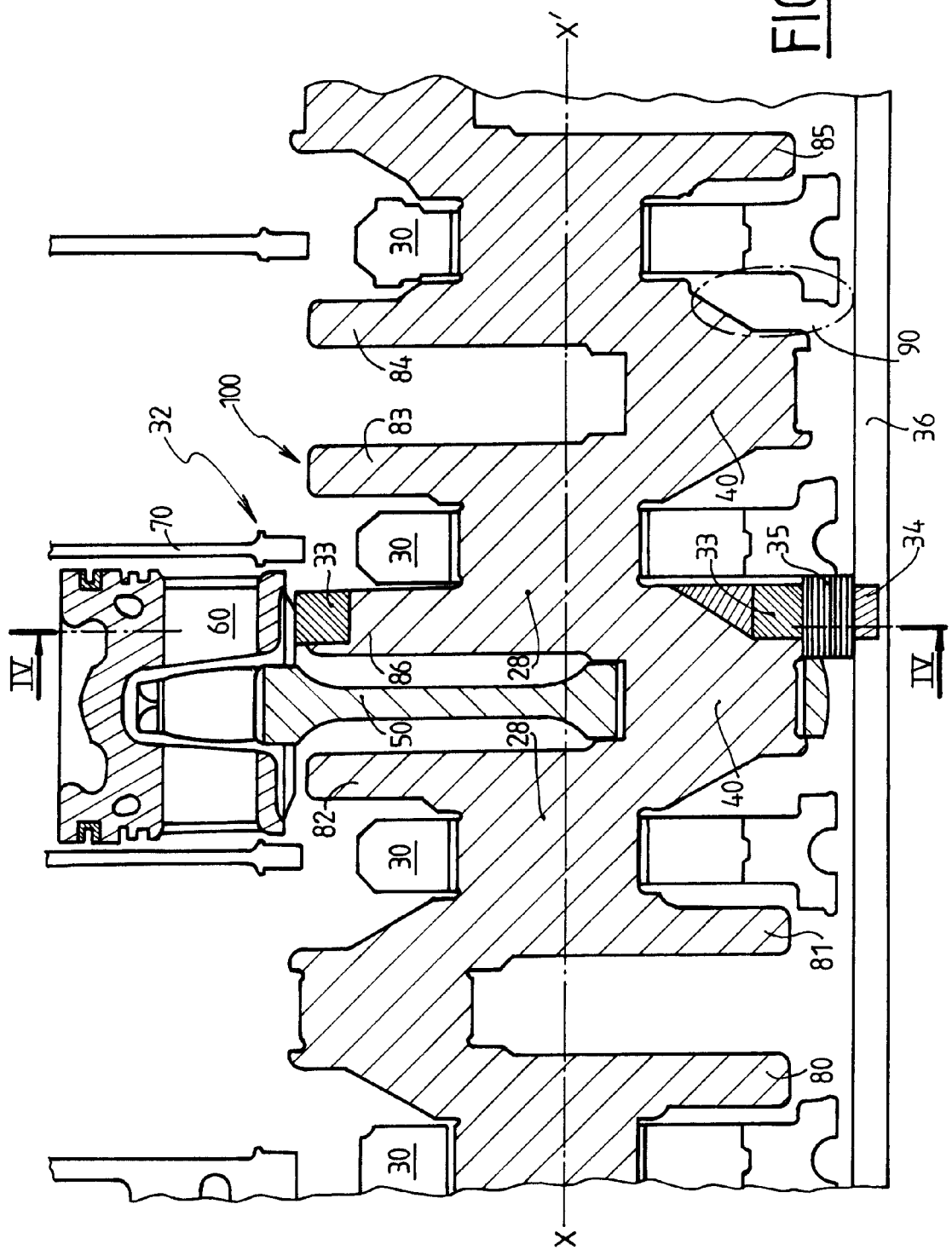
FIG. 3 shows a partial view of an example of an embodiment of a heat engine equipped with a second electrical machine in a hybrid traction drive according to the invention, as seen along the longitudinal axis of the crankshaft of this engine.

Also for clarity, only one rod 50 and one piston 60 are shown in FIG. 3. Of course, the number of rods 50 and pistons 60 depends on the type of engine involved, as does the shape of the crankshaft 100 itself.

Between the central portions 28 and the crank pins 40, the crankshaft 100 has a series of arms 80 to 86.

As shown in FIG. 3, the crankshaft 100 has at least one arm, e.g., the arm 84, around which there is an empty space.

The empty space around the arm 84 is indicated by the reference 90.

This is also the case for the arm 86, which was used to mount the second electrical machine 32.

This second electrical machine 32 has a rotor 33 that is directly mounted on the arm 86 of the crankshaft 100.

The rotor 33 can be attached by any appropriate means, in particular by adhesion, shrink fitting, or mechanical assembly.

This rotor 33 can be made of either permanent magnets or electromagnets that will be energized by leads secured inside the heat engine crankcase, or of passive ferromagnetic steel.

Naturally, the dimensions of the rotor 33 are chosen to fit into the space left around the arm 86, taking into account the space occupied by the other parts, in particular the piston 60.

In this regard, note that the crankshaft 100 can also be designed from the outset to facilitate mounting of a rotor 33 on the arm 86, for example, by giving the arm a rotationally symmetrical shape and/or by partially hollowing it out, within the limits of the resistance constraints imposed on the crankshaft 100 itself.

The second machine 32 also has a stator 34 with coils 35; this stator 34 is secured inside the crankcase 36 of the heat engine 2.

The shape of the stator 34 will naturally be determined according to the space available.

Thus, it can be rotationally symmetrical. In the example illustrated in FIG. 4, the stator 34 is partially symmetrical rotationally, so as to fit the second electrical machine 32 around the space occupied by the piston 60 when the latter is at bottom dead center.

The stator 34 could also be embodied in multiple parts.

Figure 4:
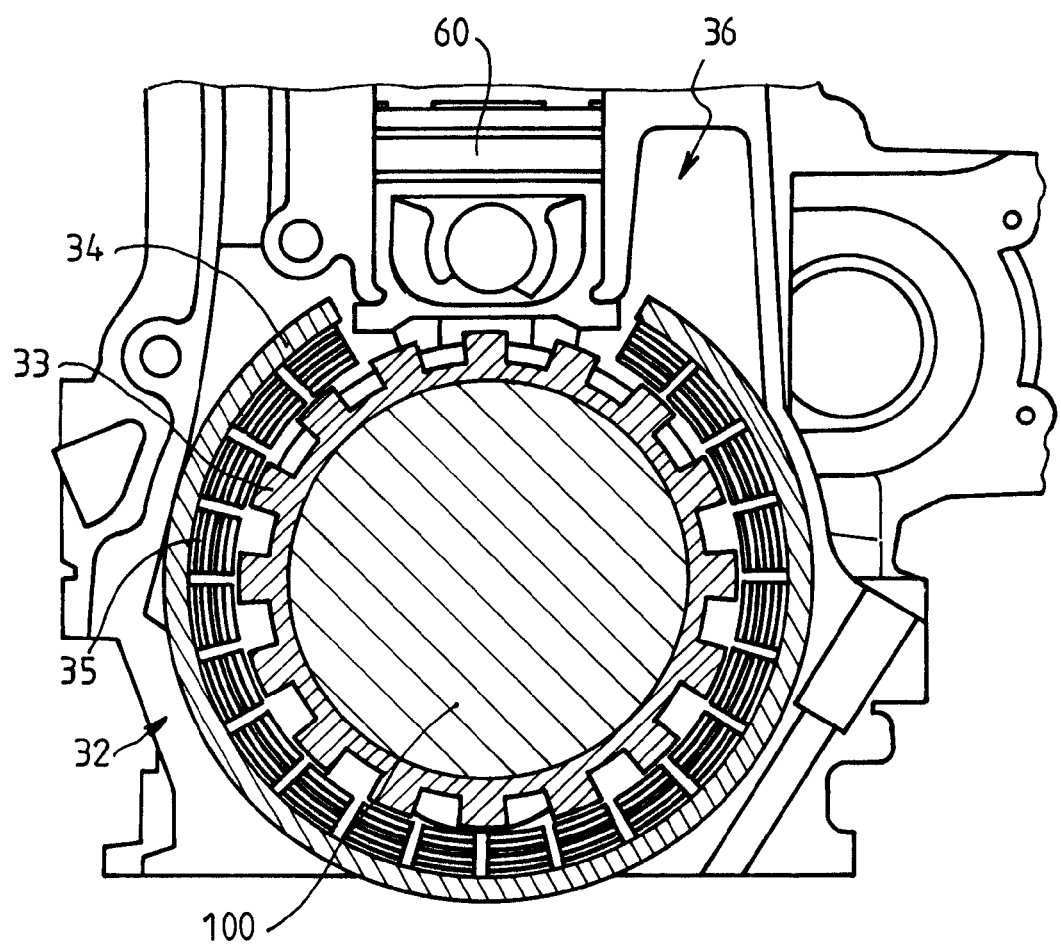
FIG. 4 is a sectional view along the axis IV-IV in FIG. 3.
Figure 5:
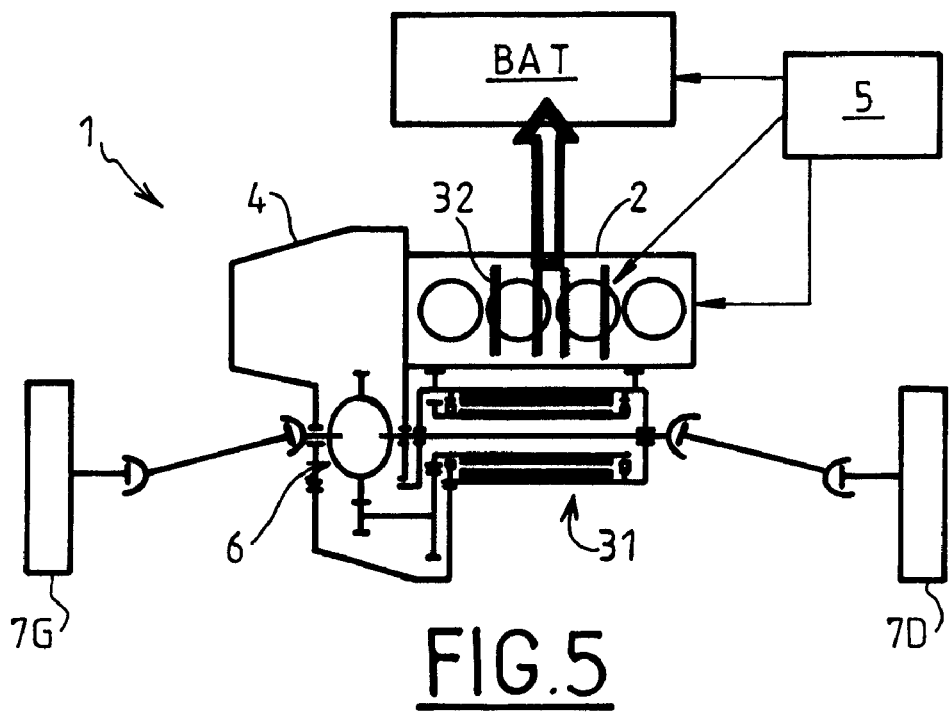
Figure 6:
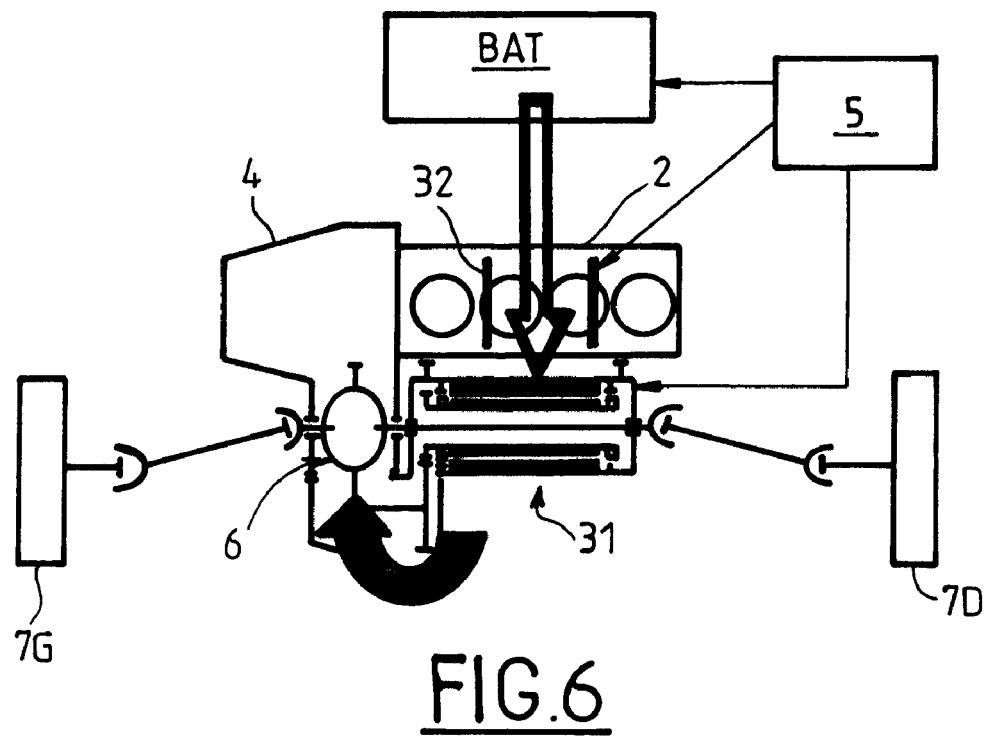

As illustrated in FIGS. 3 and 4, the second electrical machine 32 is laid out on a plane substantially perpendicular to the longitudinal axis XX' of the crankshaft 100.

Only one second electrical machine 32 is shown in FIGS. 3 and 4. The number of second electrical machines 32 mounted on the crankshaft 100 will be determined by the power requirements for the optimal operation of the vehicle 1.

Since the rotor 33 of at least one of the second electrical machines 32 is rotationally connected to the crankshaft 100, it can serve to recharge the battery BAT associated with it when the heat engine 2 is rotating and the battery is not being used to generate current. At least one of the second electrical machines 32 can also be used to recover energy during the braking phases of the vehicle 1.

In a known manner, an internal combustion engine produces significant vibrations during operation. These are due to the combustion process itself, and also to the operation of a reciprocating piston engine.

The most commonly used internal combustion engines today are so-called "four-cycle" engines in which combustion explosions occur in the various cylinders.

These explosions produce significant impacts on the pistons and these impacts are transmitted via rods and the crankshaft to the drive-line assembly of the vehicle.

Combustion explosions additionally cause significant periodic variations in actual engine torque.

Moreover, when the pistons change direction at top and bottom dead center, this produces kinematic excitation of vibrations, with highly variable frequencies.

This is why a flywheel is provided at the engine output, or possibly a twin-mass damping flywheel, so as to dampen the torsional oscillations of the crankshaft and to transmit them to the gearbox only in a very attenuated form.

These damping flywheels are of a significant weight, cost and size.

In an advantageous application, at least one of the second electrical machines 32 can be commanded to control the cyclical variations of the heat engine 2, in particular by appropriately adjusting the torque transmitted by the at least one of the second machines 32 to the crankshaft 100 while it is rotating.

This adjustment can cause the crankshaft 100 to rotate faster, or conversely, more slowly.

The advantage of this is to be able to reduce the size or simplify the design of the damping flywheels placed at the heat engine output.

Lastly, at least one of the second electrical machines 32 can be used to precisely monitor the position and the speed of the crankshaft 100 at all times.

This can be achieved simply by equipping the rotor 33 with teeth on its periphery, and by providing a discontinuity in the distribution of the teeth on the periphery of the rotor 33.

That is, a tooth can be deleted or replaced with two smaller teeth or two teeth with a space between them.

By using sensors that detect this discontinuity, the crankshaft 100 position can be determined precisely.

At least one of the coils 35 of the stator 34 of at least one of the second electrical machines 32 can be used as a sensor to monitor this discontinuity. Note that knowing the position and the speed of the crankshaft 100 can be useful, in particular to appropriately adjust the opening of the valves, the fuel injection or the ignition.

This particular embodiment makes it possible to dispense with a specific toothed wheel that is usually provided and a specific sensor.

This also frees up some space inside the heat engine crankcase and reduces manufacturing costs.

It is worth emphasizing that the invention has been described with reference to one crankshaft example. The invention is not limited to this embodiment, of course, and can be implemented with any type of crankshaft designed for a given heat engine.

We will now describe in detail the various stages of the method for managing a hybrid traction drive according to the invention, implemented by the control member 5 according to the various driving conditions of a motor vehicle 1. This description is made with reference to FIGS. 5 to 13, and focuses on the various members described above.

When the vehicle 1 is at a stop (FIG. 5), if the battery BAT charge level is too low to start the vehicle, or if the heat engine 2 temperature is too low, e.g., below a temperature at which the vehicle would not meet pollution control and passenger compartment comfort criteria, the control member 5 uses the heat engine either to recharge the battery BAT or to reach the desired temperature via at least one of the second electrical machines 32 integrated onto the crankshaft 100. By preference, the transmission will be on an engaged gear ratio so that it can respond instantaneously to a request for movement of the vehicle 1.

The term "battery" is defined as any autonomous source of electrical power on board the vehicle 1 having one or more batteries or battery packs, for example, that can moreover be recharged and discharged so as to serve simultaneously as an electrical energy storage reservoir and generator, respectively.

When the vehicle 1 is at a steady speed (FIGS. 6 and 7) and the speed is low, e.g., around 20 km/hr, the need for power to the wheel is low—less than about 10 KW. Thus, there is no advantage in using the heat engine 2, since its efficiency is very low for this power level.

Figure 7:
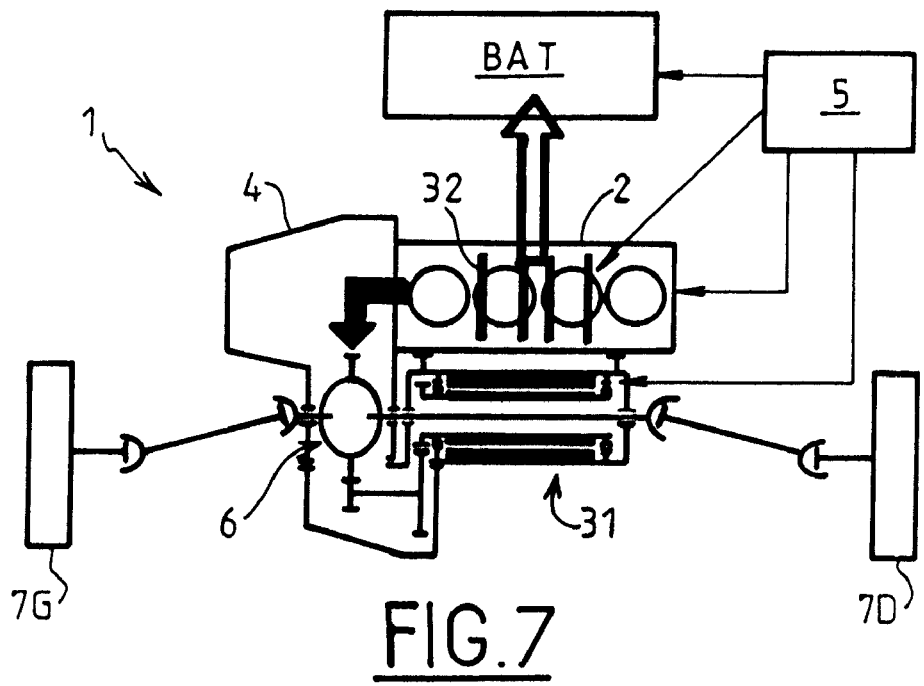
Figure 11:
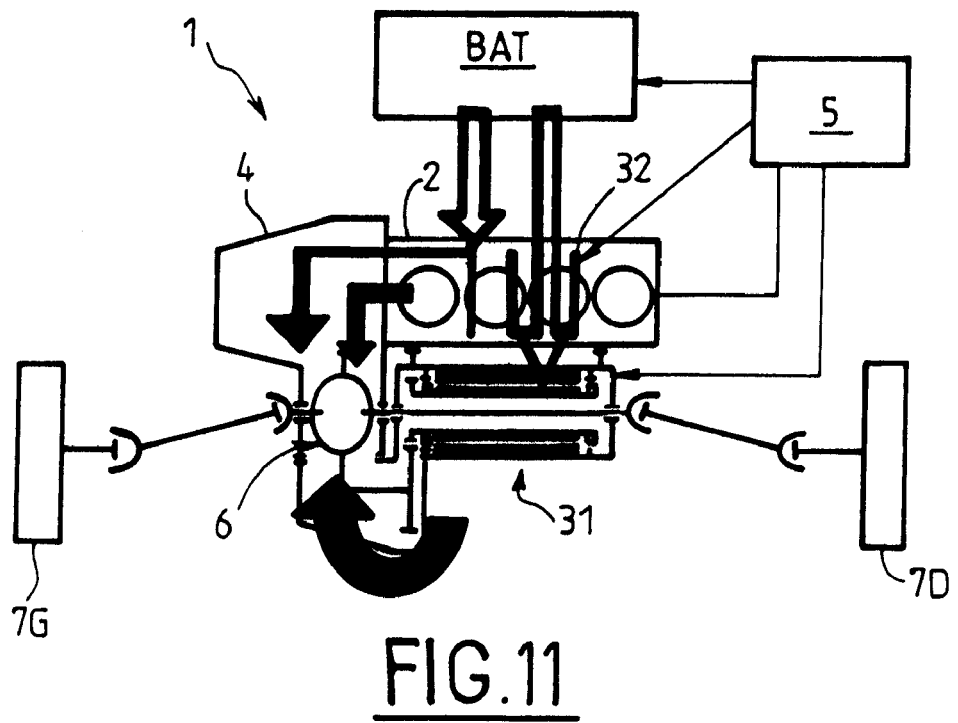
Figure 8:
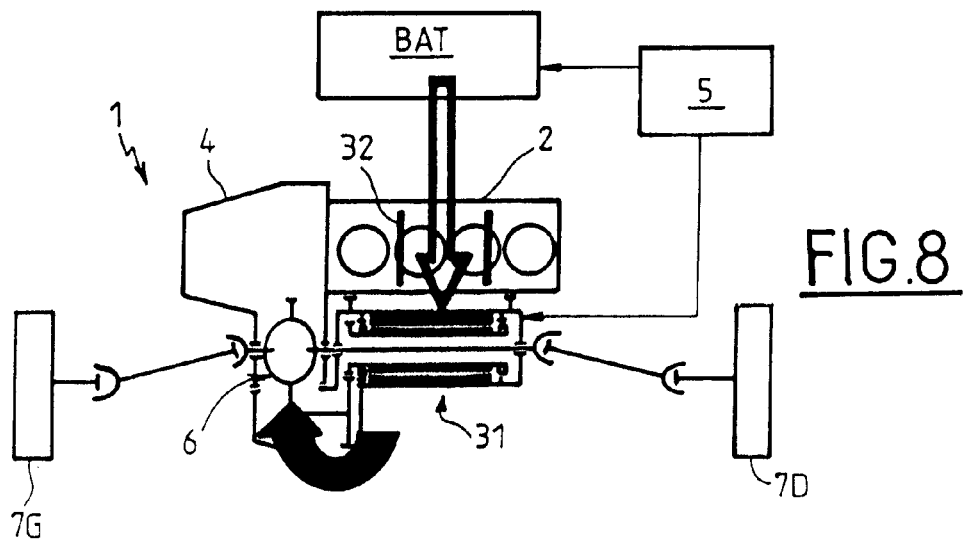
Figure 9:
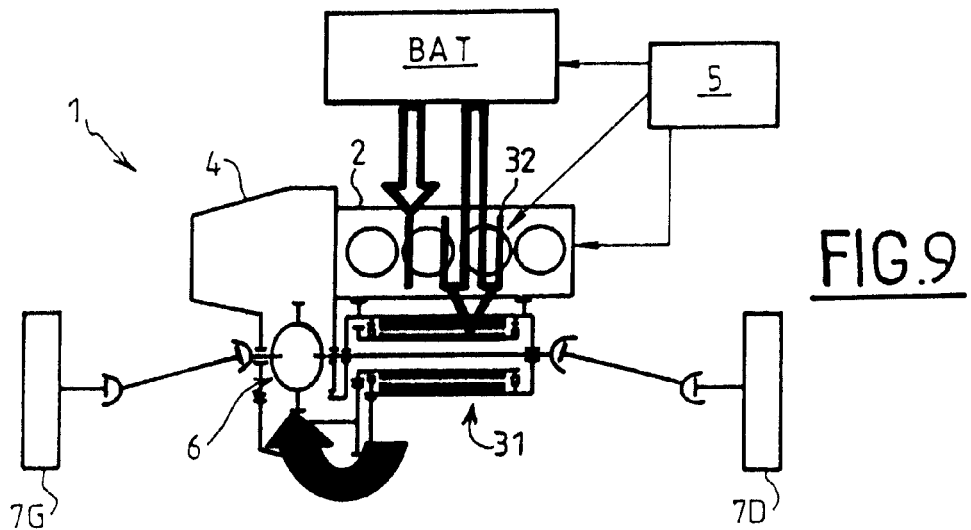
Figure 10:
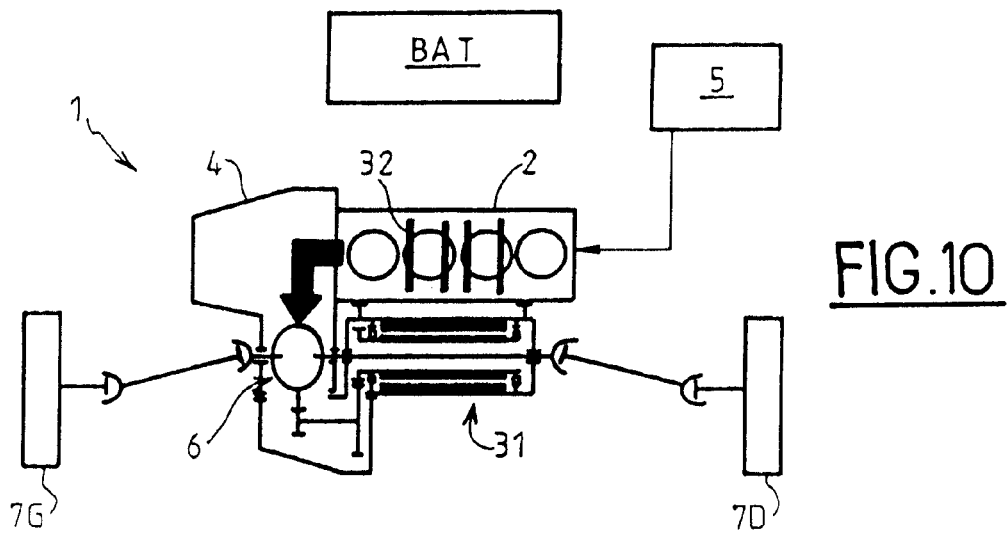
Figure 12:
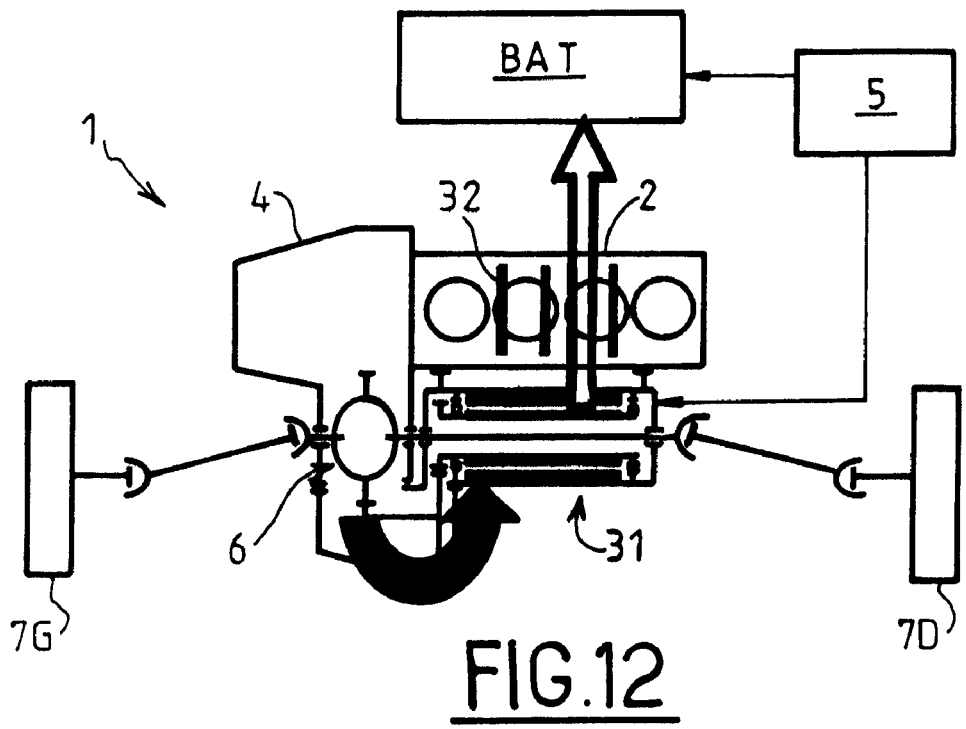
Figure 13:
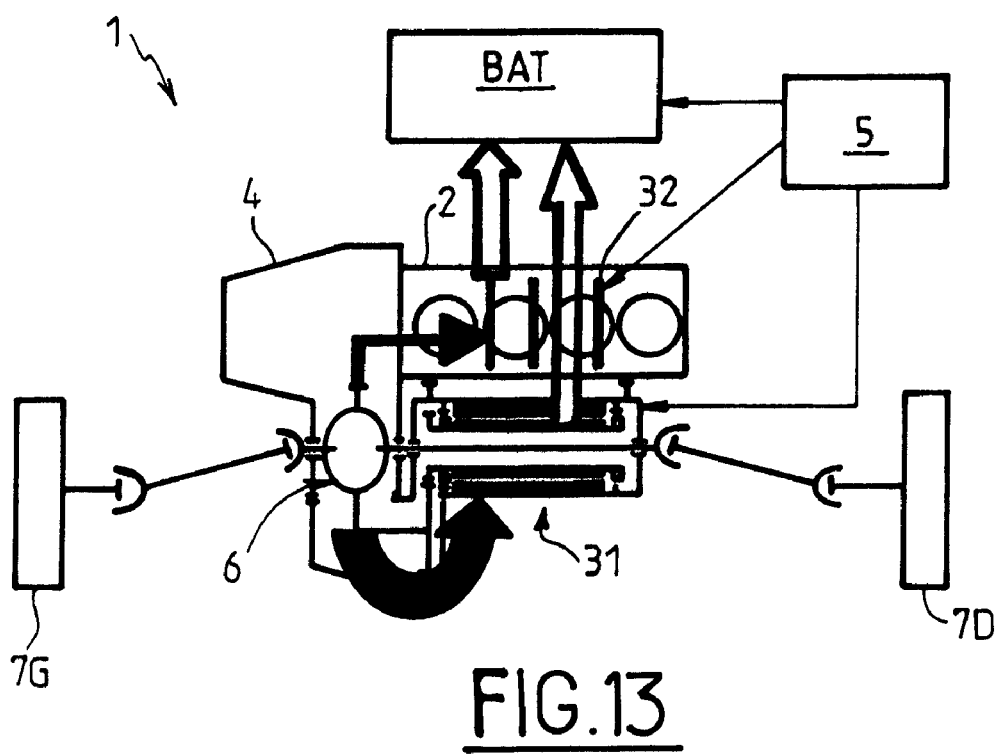

The control member 5 thus commands the traction drive as follows:

The control member 5 commands the first electrical machine 31, connected to the wheels 7G, 7D, to set the vehicle 1 in motion in pure electrical mode (FIG. 6) via the transmission member 4, until a set minimum battery BAT charge level is reached, and then the control member 5 commands the startup of the heat engine 2, which is used both to keep the vehicle 1 moving and to recharge the battery BAT (FIG. 7). As an example, at a steady speed of 20 km/h, about 1.5 KW of power is needed to keep the vehicle 1 moving. The power provided by the heat engine 2 when it is operating efficiently (or optimally) is about 7 KW. In this example, 5.5 KW are allotted to recharging the battery BAT. The time during which the heat engine 2 operates is very short, then. For example, it is around 20% of the total heat engine load time, knowing that at a steady speed, the heat engine operates intermittently; the ratio of stopped time to running time is a function of the power requested at the wheel.

Still at a steady speed, but at 60 km/h, the power needed to keep the vehicle 1 moving is now around 6.3 KW, and the power provided by the heat engine 2 when it is operating is about 7 KW. Thus, only 0.7 KW are allotted to recharging the battery BAT. The time during which the heat engine 2 operates is very long, then. For example, it is around 80% of the total heat engine load time.

The combined power needed to move the vehicle 1 forward and to recharge the battery BAT then makes it possible to bring the heat engine 2 into a higher efficiency operating range.

When the speed increases above a set speed corresponding to a power level that allows the heat engine to operate efficiently, the control member 5 deactivates the first electrical machine 31. The control member 5 is thus no longer using the electrical drive, but only the combustion drive, because then the heat engine 2 is reaching its optimal operating efficiency.

It is advantageous to use a CVT (Continuously Variable Transmission), which can optimize the engine speed in relation to the vehicle 1 speed.

Also advantageously, the control member 5 can control the recharging of the battery BAT through either the first 31 or at least one of the second electrical machines 32.

When the vehicle 1 is accelerating at a low rate (FIG. 8 to 10), depending on the battery BAT charge level and the level of power requested at the wheel, the control member 5 commands the traction drive to initiate movement (from a zero vehicle speed to a non-zero speed) in pure electrical drive mode, and then, starting at a set moment determined by a set control strategy of the traction drive, the control member 5 commands the drive to start the heat engine 2, which then powers the drive of the vehicle 1 by itself.

This latter stage is broken down into three phases:

a first, pure electric drive phase (FIG. 8), in which the control member 5 commands the battery BAT to power only the first electrical machine 31, connected to the wheels 7G and 7D; the first electrical machine 31 powers the movement of the vehicle 1 by itself, a second, still pure electric drive phase (FIG. 9), in which the first electrical machine 31 is still powering the movement of the vehicle 1, and in which the control member 5 additionally commands the battery BAT to power the second electrical machine 32 in order to start the heat engine 2; and a third, pure combustion drive phase (FIG. 10), in which the control member 5 commands the heat engine to take over from the first electrical machine 31; the heat engine 2 is then powering the vehicle 1 drive by itself via the transmission member 4. In this case, the control member 5 can command the traction drive advantageously so that the heat engine 2 recharges the battery BAT.

When the vehicle 1 is accelerating at a high rate (FIG. 11), after a very short phase identical to the low acceleration phase described above, the control member 5 commands the traction drive to devote all available power sources to the acceleration of the vehicle 1.

Thus, in this last operating mode, the potential power available is the sum of the power delivered by the heat engine 2 and the power delivered by the first and second electrical machines 31 and 32, respectively, within the limits of the maximum power of the battery BAT.

If the acceleration rate is "in between", e.g., between a low acceleration and a high acceleration, the control member 5 commands only one or the other of the first and the second electrical machines 31 or 32.

When the vehicle 1 is decelerating or braking (FIGS. 12 and 13), the control member 5 commands either the first electrical machine 31, or the first and at least one of the second electrical machines 31 and 32, based on the requested deceleration or braking amplitude and the maximum power available from the first and second electrical machines.

Thus, for example, for a gradual deceleration (FIG. 12), the control member 5 commands only the first electrical machine 31, connected to the wheels 7G and 7D, so as to directly brake the wheels 7G and 7D, up to the limit of the maximum power available from the first electrical machine 31.

In another example, for a strong deceleration (FIG. 13), the control member 5 additionally commands at least one of the second electrical machines 32, integrated into the crankshaft 100, so that it contributes to braking via the transmission member 4. A continuously variable transmission (CVT) must be chosen in this case in order to avoid torque discontinuities.

The power electronics unit needed to operate the electrical machines 31 and 32 is not shown in the figures. For example, it is attached directly onto the heat engine 2 inside the engine 2 crankcase, or at some location in the engine compartment.

The number of second electrical machines 32 integrated into the crankshaft 100, along with the dimensioning and electrical characteristics of the first and second electrical machines 31 and 32 are appropriately adjusted to the power requirements of the vehicle 1.

The invention has the advantage of meeting with all the specifications of a hybrid traction drive in the various driving modes of the vehicle 1.

Finally, in the case where the type of gearbox used is an electronically controlled manual gearbox ECGB, the first electrical machine 31, connected to the wheels 7G and 7D, is advantageously used during gear ratio shift phases to reduce the discontinuity in torque to the wheel.

Furthermore, the specific choice of first and second electrical machines 31 and 32 and their installation as described in the present application makes it possible to perform the functions with no detriment to the overall dimensions of the drive train DT.

Also advantageously, all of the electrical power needed for optimal hybrid operation of the traction drive is provided while minimizing the number of sources of electrical energy: battery and electrical machines.

Lastly, using a CVT-type transmission makes it possible to optimize the continuous choice of the operating point of the heat engine.

The present invention is not limited to the modes of embodiment described, of course, and can encompass all variants falling within the ambit of the claims.

The sequencing of the various stages just described follows a particular driving condition strategy that is not exclusive. Other sequences corresponding to other driving conditions can also be envisioned without thereby going beyond the ambit of the invention.

The invention claimed is:

1. Hybrid traction drive for a vehicle comprising:
   a heat engine equipped with a crankshaft whose crank arms extend substantially perpendicular to its longitudinal axis;
   a transmission member positioned between the crankshaft output and the driven wheels of the vehicle, the crankshaft being coupled to the wheels via the transmission member;
   at least one first electrical machine and at least one second electrical machine, each having a stator and a rotor, the first electrical machine being capable of cooperating with the transmission member and the second electrical machine being capable of cooperating with the heat engine in order to provide combustion and/or electrical drive separately or jointly to the driven wheels;
   a battery coupled to the first and second electrical machines; and
   a control member capable of controlling the battery charge/discharge process, the heat engine and the first and second electrical machines.
   wherein the first electrical machine is positioned between the transmission member and one of the driven wheels, and the second electrical machine is positioned inside the heat engine, the rotor of the second electrical machine being attached onto a crank arm of the crankshaft and its stator being secured inside the heat engine crankcase.

2. Hybrid traction drive according to claim 1, wherein at least one second electrical machine is a starter or an alternator or an alternator-starter.

3. Method for managing a hybrid fraction drive according to claim 1, comprising controlling the heat engine, the first electrical machine, the at least one second electrical machine and the battery to adjust their operation according to the vehicle driving conditions.

4. Method according to claim 3, wherein, when the vehicle is at a stop, if the battery charge level is lower than a set charge level or if the heat engine speed is lower than a set speed, the method comprises commanding the heat engine to recharge the battery via the at least one second electrical machine.

5. Method according to claim 3, wherein, with the vehicle at a steady speed, if the speed is lower than a set speed, the method comprises commanding the first electrical machine to set the vehicle in motion via the transmission member, until a set minimum battery charge level is reached, and then, once the minimum charge level is reached, controlling the heat engine, which is used to simultaneously move the vehicle forward and recharge the battery, and deactivating the first electrical machine if the speed increases beyond a set speed, to retain only the combustion drive powered solely by the heat engine.

6. Method according to claim 3, wherein, when the vehicle is accelerating at a rate less than a set threshold for a set battery charge level and at a set power level requested at the wheel, in the method comprises:
   during a first pure electric drive phase, commanding the battery to power only the first electrical machine, with the first machine powering the movement of the vehicle by itself;
   during a second phase, still a pure electric drive phase, in which the first electrical machine is still powering the movement of the vehicle, additionally commanding the battery to power the at least one second electrical machine in order to start the heat engine; and
   during a third, pure combustion drive phase, commanding the heat engine to take over from the first electrical machine, with the heat engine then powering the vehicle drive by itself via the transmission member.

7. Method according to claim 6, wherein, during the third, pure combustion drive phase, the method comprises commanding the heat engine to recharge the battery.

8. Method according to claim 3, wherein, when the vehicle is accelerating at a rate higher than a set threshold, the method comprises jointly commanding the heat engine, the first and the at least one second electrical machines and the battery to devote all available power to the acceleration of the vehicle.

9. Method according to claim 3, wherein, when the vehicle acceleration rate is in between, the method comprises commanding only one or the other of the first and the at least one second electrical machines.

10. Method according to claim 9, wherein the method comprises commanding only one or the other of the first and the at least one second electrical machines when the vehicle acceleration rate is between an acceleration rate lower than a first set threshold and an acceleration rate higher than a second set threshold.

11. Method according to claim 3, wherein when the vehicle is decelerating at a rate lower than a set threshold, the method comprises commanding only the first electrical machine so as to enable regenerative braking.

12. Control method according to claim 3, wherein, when the vehicle is decelerating at a rate higher than a set threshold and the transmission member has a continuously variable transmission, the method comprises commanding the first electrical machine, connected to the wheels, and the at least one second electrical machine, integrated into the crankshaft so as to contribute to braking the wheels, along with the first electrical machine, via the transmission member.

13. Method according to claim 3, wherein, the transmission member having an electronically controlled manual gearbox, the method comprises commanding the first electrical machine, connected to the wheels, to take over from the heat engine during gear ratio change phases in order to reduce the discontinuity in torque to the wheel.

14. Vehicle equipped with a hybrid traction drive in accordance with claim 1.

15. Vehicle equipped with a hybrid traction drive that employs the control method according to claim 3.

* * * * *